US008995352B2

United States Patent
Boström et al.

(10) Patent No.: US 8,995,352 B2
(45) Date of Patent: *Mar. 31, 2015

(54) PROHIBITION OF SOUNDING REFERENCE SIGNAL TRANSMISSION ON NEWLY ACTIVATED SECONDARY CELLS

(71) Applicant: Telefonaktiebolaget L M Ericsson (publ), Stockholm (SE)

(72) Inventors: Lisa Boström, Solna (SE); Robert Baldemair, Solna (SE); Henning Wiemann, Aachen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 14/259,290

(22) Filed: Apr. 23, 2014

(65) Prior Publication Data

US 2014/0233489 A1    Aug. 21, 2014

Related U.S. Application Data (63) Continuation of application No. 13/263,230, filed as application No. PCT/SE2011/051112 on Sep. 14, 2011, now Pat. No. 8,743,787.

(60) Provisional application No. 61/481,468, filed on May 2, 2011.

(51) Int. Cl.
*H04W 4/00* (2009.01)
(Continued)

(52) U.S. Cl.
CPC .............. *H04W 24/02* (2013.01); *H04L 5/0051* (2013.01); *H04L 5/0053* (2013.01); *H04W 72/02* (2013.01); *H04L 5/0048* (2013.01); *H04L 5/0091* (2013.01); *H04W 72/0413* (2013.01)
USPC ............................. 370/328; 370/241; 370/248

(58) Field of Classification Search
USPC ................................... 370/328–339, 248, 241
See application file for complete search history.

(56) References Cited

U.S. PATENT DOCUMENTS

2009/0257387 A1    10/2009   Gholmieh et al.
(Continued)

FOREIGN PATENT DOCUMENTS

EP            2230870 A1       9/2010
(Continued)

OTHER PUBLICATIONS

Panasonic, "MAC Control Element for Component Carrier Management", 3GPP TSG-RAN WG2 Meeting #69bis, Apr. 12, 2010, pp. 1-3, R2-102520, Beijing, China.

3rd Generation Partnership Project, "3rd Generation Partnership Project; Technical Specification Group Radio Access Network; Evolved Universal Terrestrial Radio Access (E-UTRA); Medium Access Control (MAC) protocol specification (Release 10)", Technical specification, 3GPP TS 36.321 V10.1.0, Mar. 1, 2011, pp. 32-33, 3GPP, France.

(Continued)

*Primary Examiner* — Iqbal Zaidi
(74) *Attorney, Agent, or Firm* — Coats & Bennett, PLLC (57) ABSTRACT

In a wireless network supporting aggregation of uplink component carriers, sounding reference signals, SRS, are transmitted on an uplink, UL, primary component carrier. An activation command corresponding to an UL secondary component carrier, SCC, is received, in response to which the receiving transceiver determines whether it has valid timing information for the UL SCC, wherein valid timing information for the UL SCC indicates that the UL SCC is UL synchronized. In response to this determination, transmission of SRS on the UL SCC is enabled if the UL SCC is synchronized, when SRS is configured for the UL SCC. Otherwise, transmission of SRS on the UL SCC is prohibited until the UL SCC is UL synchronized.

14 Claims, 5 Drawing Sheets

(51) Int. Cl.
*H04W 24/02* (2009.01)
*H04L 5/00* (2006.01)
*H04W 72/02* (2009.01)
*H04W 72/04* (2009.01)

(56) References Cited

U.S. PATENT DOCUMENTS

2010/0080187 A1   4/2010   Papasakellariou
2012/0213154 A1*  8/2012   Gaal et al. .................... 370/328
2012/0257513 A1* 10/2012   Yamada ........................ 370/248

FOREIGN PATENT DOCUMENTS

| WO | 2010151213 A1 | 12/2010 | |
|---|---|---|---|
| WO | 2011098121 A1 | 8/2011 | |
| WO | WO 2011098121 A1 * | 8/2011 | ............ H04W 24/00 |

OTHER PUBLICATIONS

QUALCOMM Incorporated, "Supporting Multiple Timing Advance Groups", 3GPP TSG-RAN WG2 Meeting #68bis, Jan. 18, 2010, pp. 1-3, R2-100423, Velencia, Spain.

* cited by examiner

PROHIBITION OF SOUNDING REFERENCE SIGNAL TRANSMISSION ON NEWLY ACTIVATED SECONDARY CELLS

This application is a continuation of U.S. patent application Ser. No. 13/263,230, filed Oct. 6, 2011, which is a national stage application of PCT/SE2011/051112, filed Sep. 14, 2011, which claims the benefit of U.S. Provisional Application Ser. No. 61/481,468, filed May 2, 2011, the disclosures of each of which are incorporated herein by reference in their entirety.

TECHNICAL FIELD

The present invention relates generally to the control of devices in wireless communication networks, and more particularly relates to techniques for configuring and transmitting reference signals in these networks.

BACKGROUND

Orthogonal Frequency-Division Multiplexing (OFDM) technology is a key underlying component of the fourth-generation wireless network technologies known as Long-Term Evolution (LTE) and developed by the 3rd-Generation Partnership Project (3GPP). As is well known to those skilled in the art, OFDM is a digital multi-carrier modulation scheme employing a large number of closely-spaced orthogonal sub-carriers. Each sub-carrier is separately modulated using conventional modulation techniques and channel coding schemes. In particular, 3GPP has specified Orthogonal Frequency Division Multiple Access (OFDMA) for the downlink transmissions from the base station to a mobile terminal, and single carrier frequency division multiple access (SC-FDMA) for uplink transmissions from a mobile terminal to a base station. Both multiple access schemes permit the available sub-carriers to be allocated among several users.

SC-FDMA technology employs specially formed OFDM signals, and is therefore often called "pre-coded OFDM" or Discrete-Fourier-Transform (DFT)-spread OFDM. Although similar in many respects to conventional OFDMA technology, SC-FDMA signals offer a reduced peak-to-average power ratio (PAPR) compared to OFDMA signals, thus allowing transmitter power amplifiers to be operated more efficiently. This in turn facilitates more efficient usage of a mobile terminal's limited battery resources. SC-FDMA is described more fully in Myung, et al., "Single Carrier FDMA for Uplink Wireless Transmission," IEEE Vehicular Technology Magazine, vol. 1, no. 3, September 2006, pp. 30-38.

Figure 1:
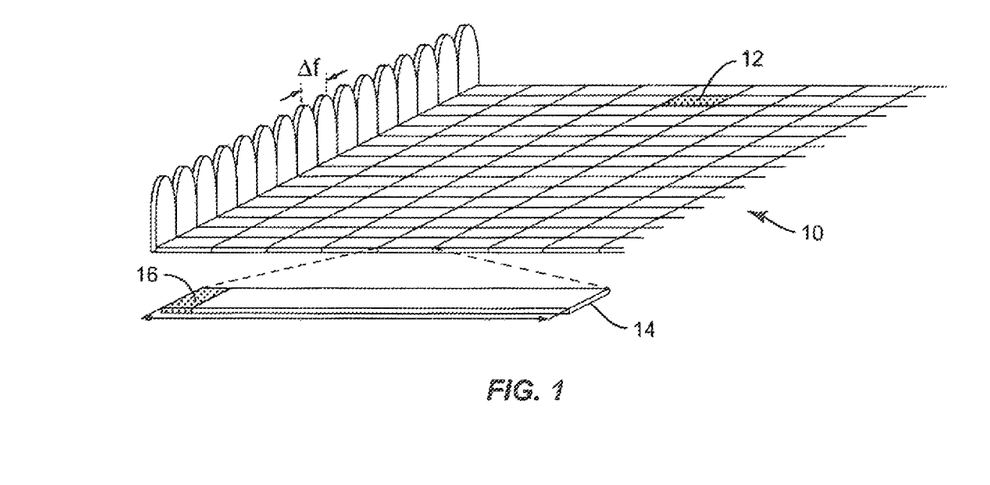
FIG. 1 illustrates features of the OFDM time-frequency resource grid.

The basic LTE physical resource, for both uplink and downlink communications, can be viewed as a time-frequency grid. This concept is illustrated in FIG. 1, which shows a number of so-called subcarriers in the frequency domain, at a frequency spacing of $\Delta f$, divided into OFDM symbol intervals in the time domain. Each grid element 12 is called a resource element, and corresponds to one subcarrier during one OFDM symbol interval, on a given antenna port. One of the unique aspects of OFDM is that each symbol 14 begins with a cyclic prefix 16, which is essentially a reproduction of the last portion of the symbol 14 affixed to the beginning. This feature minimizes problems from multipath, over a wide range of radio signal environments.

Figure 2:
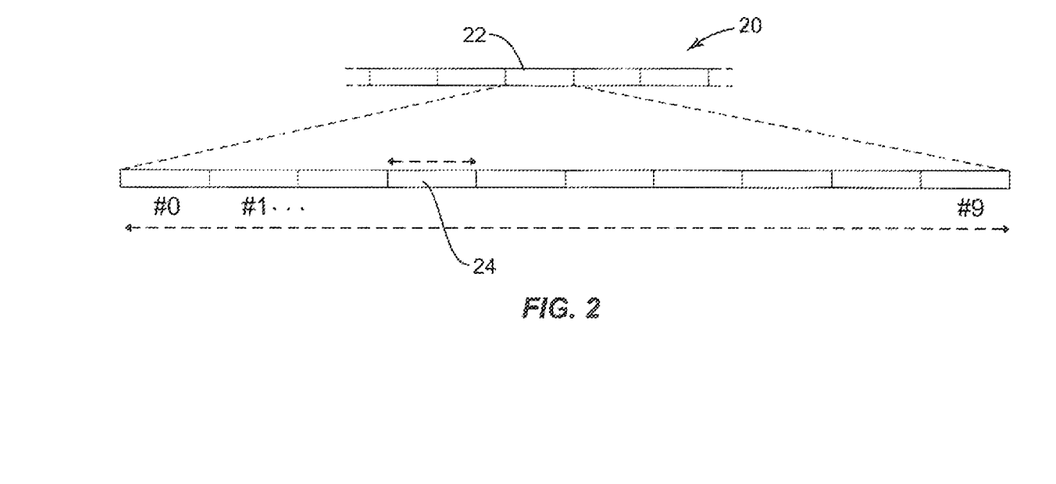
FIG. 2 illustrates the time-domain structure of an LTE signal.

In the time domain, LTE downlink and uplink transmissions are organized into radio frames of ten milliseconds each, each radio frame consisting of ten equally-sized subframes of one millisecond duration. This is illustrated in FIG. 2, where an LTE signal 20 includes several frames 22, each of which is divided into ten subframes 24. Not shown in FIG. 2 is that each subframe 24 is further divided into two slots, each of which is 0.5 milliseconds long.

LTE link resources are organized into "resource blocks," defined as time-frequency blocks with a duration of 0.5 milliseconds, corresponding to one slot, and encompassing a bandwidth of 180 kHz, corresponding to 12 contiguous sub-carriers with a spacing of 15 kHz. Resource blocks are numbered in the frequency domain, starting with 0 from one end of the system bandwidth. Two time-consecutive resource blocks represent a resource block pair, and correspond to the time interval upon which scheduling operates. Of course, the exact definition of a resource block may vary between LTE and similar systems, and the inventive methods and apparatus described herein are not limited to the numbers used herein.

In general, however, resource blocks may be dynamically assigned to mobile terminals, and may be assigned independently for the uplink and the downlink. Depending on a mobile terminal's data throughput needs, the system resources allocated to it may be increased by allocating resource blocks across several sub-frames, or across several frequency blocks, or both. Thus, the instantaneous bandwidth allocated to a mobile terminal in a scheduling process may be dynamically adapted to respond to changing conditions.

Figure 3:
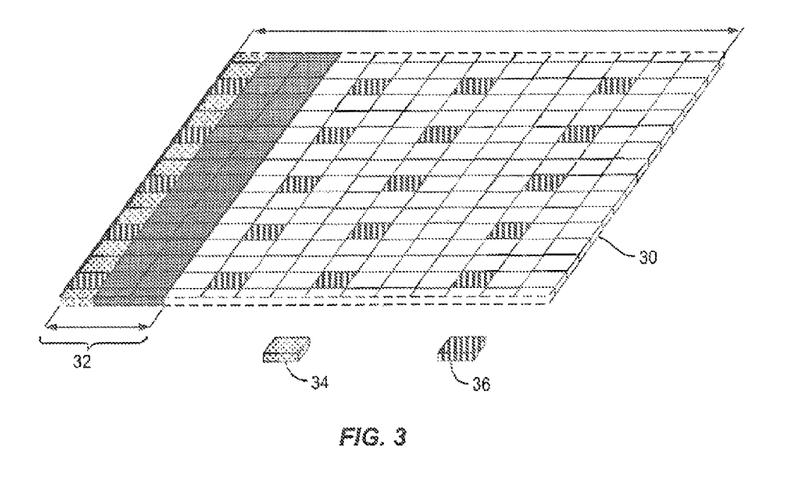
FIG. 3 illustrates features of an LTE downlink subframe.

For scheduling of downlink and uplink data to and from the mobile terminal, the base station transmits control information in each subframe. This control information identifies the mobile terminals to which data is targeted and the resource blocks, in the current downlink subframe, that are carrying the data for each terminal. The first one, two, three, or four OFDM symbols in each subframe are used to carry this control signaling. In FIG. 3, a downlink subframe 30 is shown, with three OFDM symbols allocated to control region 32. The control region 32 consists primarily of control data elements 32, but also includes a number of reference symbols 34, used by the receiving station to measure channel conditions. These reference symbols 34 are interspersed at pre-determined locations throughout the control region 32 and the rest of the subframe 30.

Uplink user data is carried on the Physical Uplink Shared Channel (PUSCH), which is defined by the configured uplink transmission bandwidth and the frequency hopping pattern signaled to the mobile terminal, if any. The Physical Uplink Control Channel (PUCCH) carries uplink control information, such as CQI reports and ACK/NACK information for data packets received in the downlink. The PUCCH is transmitted on a reserved frequency region in the uplink, identified to the mobile terminal by higher-layer signaling.

Two types of reference signals are used in the uplink. The demodulation reference signal (DRS) is used by the eNodeB receiver for channel estimation in order to demodulate control and data channels. The DRS occupies the fourth symbol in each slot (for normal cyclic prefix) and spans the same bandwidth as the allocated uplink data. The sounding reference signal (SRS) provides uplink channel quality information for use by the eNodeB in scheduling decisions. The UE sends a sounding reference signal in parts of the configured transmission bandwidth where no uplink data transmission is available. The SRS is transmitted in the last symbol of the subframe. The specific configuration of the sounding signal, in terms of its bandwidth, duration, and periodicity, is provided to the mobile terminal via higher-layer signaling.

Release 8 of the LTE specifications has recently been standardized. Among its features is support for bandwidths up to 20 MHz. However, in order to meet the IMT-Advanced requirements for very high data rates, 3GPP has initiated work on LTE Release 10 specification. One objective of Release 10 is the support of bandwidths larger than 20 MHz. The Release 10 and later releases of the LTE specification are sometimes referred to as "LTE-Advanced."

One important requirement on LTE Release 10 is to assure backward compatibility with LTE Release 8, including with respect to spectrum compatibility. This means that an LTE Release 10 carrier signal, which might be wider than 20 MHz, should appear to a Release 8 mobile terminal in that event as several smaller LTE carriers. This concept is known as carrier aggregation (CA), or "multi-carrier" operation, and each of these smaller LTE carriers is often referred to as a component carrier (CC).

For some time following the initial deployment of LTE Release 10 networks, it can be expected that there will be a relatively small number of LTE Release 10-capable terminals, compared to so-called legacy terminals that are designed to Release 8 of the specifications. Therefore, it is necessary to assure an efficient use of a wide carrier also for legacy terminals, i.e., that it is possible to implement wide carriers, so that Release 10 mobile terminals can exploit the very high data rates, but in such a way that legacy terminals can be scheduled in each part of the wideband LTE Release 10 carrier. With carrier aggregation, an LTE Release 10 terminal can receive multiple component carriers, where each component carrier can have the same structure as a Release 8 carrier.

Figure 4:
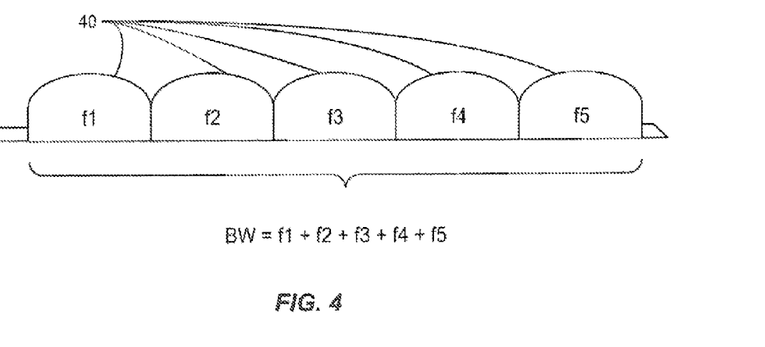
FIG. 4 illustrates the aggregation of multiple carriers in a system that employs carrier aggregation.

The carrier aggregation concept is illustrated in FIG. 4, where five component carriers 40 are illustrated, with respective component carrier bandwidths of f1, f2, f3, f4, f5. In this case, the total bandwidth available to a Release 10 mobile terminal is the sum of the component carrier bandwidths. Release 8 mobile terminals can be scheduled to use resources in any one of the component carriers. Note that while the component carriers in FIG. 4 are illustrated as contiguous (i.e., immediately adjacent to one another in frequency), aggregated carrier configurations where one or more of the component carriers is not adjacent to the others are also possible.

Furthermore, the number of aggregated component carriers, as well as the bandwidth for each individual component carrier, may be different for uplink and downlink operation. A symmetric configuration refers to the case where the number of component carriers in downlink and uplink is the same, while an asymmetric configuration refers to the case where the number of component carriers is different. It is important to note that the number of component carriers configured in a given cell may be different from the number of component carriers "seen" by a terminal. For instance, a particular terminal may support more downlink component carriers than uplink component carriers, for example, even though the cell is configured with the same number for uplink and downlink.

During initial access to the network, a LTE Release 10 terminal behaves similarly to a LTE Release 8 terminal. Upon successful connection to the network using a single component carrier for each of the uplink and downlink, a terminal may—depending on its own capabilities and the network—be configured with additional component carriers in either or both of the uplink and downlink. Configuration of the carriers is performed with Radio Resource Control (RRC) signaling.

Due to the heavy signaling and rather slow speed of RRC signaling, a terminal may be configured to operate with multiple component carriers even though not all of them are continuously used. If a terminal is configured on multiple component carriers, this would suggest that it has to monitor all downlink component carriers for the Physical Downlink Control Channel (PDCCH) and the Physical Downlink Shared Channel (PDSCH). This implies the use of a wider receiver bandwidth, higher sampling rates, and so on, at all times, potentially resulting in higher power consumption than necessary.

To mitigate the above problems, LTE Release 10 supports activation of component carriers, in addition to configuration of component carriers. With this approach, a mobile terminal continuously monitors only component carriers that are both configured and activated. Since the activation process is based on Medium Access Control (MAC) control elements—which are much faster than RRC signaling—an activation/de-activation process can quickly adjust the number of activated component carriers to match the number that are required to fulfill the current data rate needs. Upon arrival of large data amounts, multiple component carriers are activated, used for data transmission, and then quickly de-activated if no longer needed. All but one component carrier, the downlink primary component carrier (DL PCC), can be de-activated. Activation therefore provides the possibility to keep multiple component carriers configured, for activation on an as-needed basis. Most of the time, a terminal would have only one or a very few component carriers activated, resulting in a lower reception bandwidth and lower battery consumption.

SUMMARY

In advanced systems that support carrier aggregation, sometimes known as multi-carrier operation, the timing information used by the mobile terminal to keep uplink transmissions on one or more secondary component carriers synchronized at the receiving base station may differ from that used to synchronized transmissions on the primary component carrier. Upon activation of a secondary component carrier, it may be unclear whether the mobile terminal has appropriate timing information to maintain synchronization for that component carrier. Transmissions of various signals, including sounding reference signals, on an unsynchronized carrier can cause interference problems at the receiving base station. Accordingly, several techniques are described herein for reducing interference in a wireless communication system that supports uplink carrier aggregation.

In one example method according to some embodiments of the present invention, sounding reference signals (SRS) are transmitted on an uplink (UL) primary component carrier. An activation command corresponding to an UL secondary component carrier (SCC) is received, in response to which the receiving wireless transceiver determines whether the wireless transceiver has valid timing information for the UL SCC, wherein valid timing information for the UL SCC indicates that the UL SCC is UL synchronized. In response to this determination, transmission of SRS on the UL SCC is enabled if the UL SCC is synchronized, when SRS is configured for the UL SCC. Otherwise, transmission of SRS on the UL SCC is prohibited until the UL SCC is UL synchronized.

In some embodiments, determining whether the wireless transceiver has valid timing information for the UL SCC comprises determining that the UL SCC belongs to a pre-determined group and then determining that the UL SCC is UL synchronized if any member of the group is synchronized, and otherwise determining that the UL SCC is not UL synchronized.

In several embodiments, additional techniques are used to determine when SRS transmission may be enabled. For instance, in some embodiments, timing information is received for at least one member of the pre-determined group, and, in response to the timing information, transmission of SRS is enabled on the UL SCC when SRS is configured. This timing information is a timing advance command received in a MAC control element, in some embodiments, and is a timing advance (TA) command received in response to a random access procedure performed in response to a random access order for at least one member of the pre-determined group, in others. In still others, the timing information is a timing advance command received in response to a terminal-initiated random access procedure.

In other embodiments, upon determining that the UL SCC is not UL synchronized, the wireless transceiver waits a pre-determined delay time and, upon expiration of the pre-determined delay time, no longer prohibits transmission of SRS on the UL SCC carrier.

In other embodiments, determining whether the wireless transceiver has valid timing information for the UL SCC comprises receiving a flag at the wireless transceiver, the flag indicating whether the wireless transceiver has valid timing information for the UL SCC. In still others, determining whether the wireless transceiver has valid timing information for the UL SCC comprises receiving an activation command that contains a random access order, wherein transmission of SRS on the UL SCC is prohibited until a random access procedure for the UL SCC is completed. In some embodiments, transmission of SRS on the UL SCC is prohibited only until a TA command valid for the UL SCC is received as part of the random access procedure. In yet other embodiments, the receipt of an uplink grant for the UL SCC indicates that transmission of SRS on the UL SCC when SRS is configured may be enabled.

Apparatus for carrying out the various processes disclosed herein and summarized above are also described, including wireless transceivers that are configured to carry out the several methods summarized above and that are suitable for use in a mobile station operating in a wireless communication system that supports multi-carrier operation. Of course, the present invention is not limited to the features and advantages summarized above. Indeed, those skilled in the art will recognize additional features and advantages of the present invention upon reading the following detailed description and viewing the attached drawings.

DETAILED DESCRIPTION

Various embodiments of the present invention are now described with reference to the drawings, wherein like reference numerals are used to refer to like elements throughout. In the following description, numerous specific details are set forth for purposes of explanation, in order to provide a thorough understanding of one or more embodiments. It will be evident to one of ordinary skill in the art, however, that some embodiments of the present invention may be implemented or practiced without one or more of these specific details. In other instances, well-known structures and devices are shown in block diagram form in order to facilitate describing embodiments.

Note that although terminology from 3GPP's specifications for LTE and LTE-Advanced is used throughout this disclosure to exemplify the invention, this should not be seen as limiting the scope of the invention to only these systems. Other wireless systems including or adapted to include multi-carrier transmission techniques may also benefit from exploiting the ideas covered within this disclosure.

Also note that terminology such as "base station," "eNodeB," "mobile station," and "UE" should be considered non-limiting as applied to the principles of the invention. In particular, while detailed proposals applicable to the uplink in LTE-Advanced are described here, the described techniques may be applied to the downlink in other contexts. Thus, in general the base station or eNodeB in the discussion that follows may be considered more generically as "device 1" and the mobile station or "user equipment" (UE) considered as "device 2," in some circumstances, with these two devices comprising communication nodes, or communication stations, communicating with each other over a radio channel.

Finally, the terms "component carrier," "primary component carrier," and "secondary component carrier" are used in the following discussion to refer to one of the component signals transmitted by either the eNB, i.e, an downlink component carrier, or by the UE, i.e., an uplink component carrier, which may be aggregated with one or more other component carrier signals transmitted by the same device at another frequency. The terms "cell," "primary cell" (PCell), and "secondary cell" (SCell) are also extensively used in the following description. The term "cell" may generally be understood more broadly to include more than just a carrier signal, or even an associated pair of downlink and uplink component carriers, for example, since the term "cell" implies a certain region of coverage and the ability to support one or several communication links. However, in this document the terms "cell" and "component carrier" are generally used interchangeably, and should both be understood to refer to a component carrier signal in a multi-carrier wireless system, unless the context clearly indicates otherwise. Thus, the terms "primary cell" or "PCell" may be used interchangeably herein with "primary component carrier" or "PCC."

Figure 5:
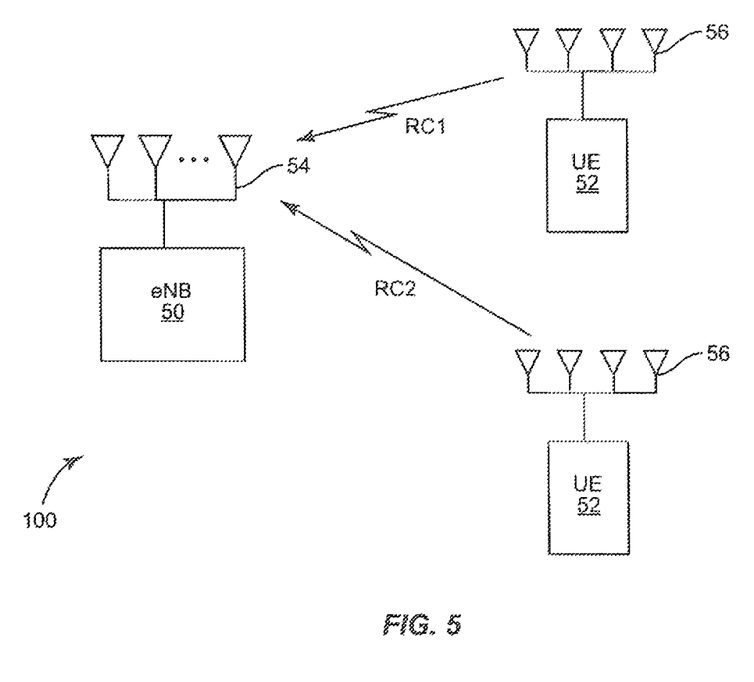
FIG. 5 illustrates components of an example wireless network.

FIG. 5 illustrates components of a wireless network 100, including base station 50 (labeled eNB, per 3GPP terminology) and mobile stations 52 (each labeled UE, again according to 3GPP terminology). eNB 50 communicates with UEs 52 using one or more antennas 54; individual ones or groups of these antennas are used to serve pre-defined sectors and/or to support any of various multi-antenna transmission schemes, such as multiple-input multiple-output (MIMO) transmission schemes. Likewise, each UE 52 communicates with eNB 50 using antennas 56. LTE-Advanced is expected to support UEs having up to four transmit antennas, and eNBs having as many as eight. Thus, the pictured UEs 52, each having four antennas, can transmit up to four spatially multiplexed layers to the eNB 52 over radio channels RC1 and RC2, depending on the channel conditions.

Several of the techniques that will be described in detail below can be implemented in connection with a wireless transceiver in a radio access terminal, such as the mobile stations 52 illustrated in FIG. 5. A radio access terminal, which communicates wirelessly with fixed base stations in the wireless network, can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, or a computing device or other processing device connected to a wireless modem. Note that the term radio access terminal as used herein is not intended to be limited to devices that are normally carried and/or operated by individual users; the term also includes wireless devices intended for installation in so-called machine-to-machine (M2M) applications, fixed wireless applications, and the like.

Similarly, several of the techniques described below are implemented in connection with a wireless base station, such as the base station 50 illustrated in FIG. 5. Base station 50 communicates with access terminals and may be referred to in various contexts as an access point, Node B, Evolved Node B (eNodeB or eNB), or some other terminology. Although the various base stations discussed herein are generally described and illustrated as though each base station is a single physical entity, those skilled in the art will recognize that various physical configurations are possible, including those in which the functional aspects discussed here, such as scheduling functions and radio functions, are split between two physically separated units. Thus, the term "base station" is used herein to refer to a collection of functional elements, one of which is a radio transceiver that communicates wirelessly with one or more mobile stations, which may or may not be implemented as a single physical unit.

As noted earlier, Release 10 of the 3GPP specifications for LTE includes support for carrier aggregation in both the downlink and uplink. This has several implications for both the scheduling of resources and for the measurement of channel characteristics. More particularly, as briefly described above, LTE Release 10 supports a distinction between activated component carriers and configured component carriers. A particular number of component carriers for each of the downlink and uplink are configured by Radio Resource Control (RRC) signaling. While configured, these component carriers are generally available for carrying user data. However, to reduce the burden that would otherwise be associated with continuously monitoring configured carriers, the LTE Release 10 standards specify that individual component carriers can be activated and deactivated, using much quicker Medium Access Control (MAC) signaling.

With this approach, a mobile terminal continuously monitors only component carriers that are both configured and activated. Since the activation process is based on MAC control elements, which can be generated and transmitted much more quickly than RRC signaling, an activation/de-activation process controlled by the eNB can quickly adjust the number of activated component carriers to match the number that are required to fulfill the current data rate needs. Upon arrival of large data amounts, multiple component carriers are activated, used for data transmission, and then quickly de-activated if no longer needed. All but one component carrier, the downlink primary component carrier (DL PCC), can be deactivated. Activation therefore provides the possibility to keep multiple component carriers configured, for activation on an as-needed basis. Most of the time, a terminal would have only one or a very few component carriers activated, resulting in a lower reception bandwidth and lower battery consumption.

Procedures to be followed by access terminals (user equipment, or UE, in 3GPP terminology) for the activation and deactivation of a secondary cell (SCell) are specified in 3GPP TS 36.321, "3rd Generation Partnership Project; Technical Specification Group Radio Access Network; Evolved Universal Terrestrial Radio Access (E-UTRA); Medium Access Control (MAC) Protocol Specification (Release 10)," v. 10.1.0, §5.13, March 2011. This document specifies that if a UE receives an Activation/Deactivation MAC control element activating an SCell, the UE should "apply normal SCell operation, which includes: transmitting SRS on the SCell (for uplink SCell); reporting channel quality indication (CQI), precoding matrix indication (PMI) and Rank Indication (RI) for the SCell; monitoring of the PDCCH on the SCell (for downlink SCell); monitoring of PDCCH for the SCell (for downlink SCell); and starting or restarting a SCell deactivation timer associated with the SCell.

Further, according to the current specifications, if a UE receives an Activation/Deactivation MAC control element deactivating an SCell, or if the SCell deactivation timer associated with an activated SCell expires, the UE should deactivate the SCell, stop the sCell deactivation timer associated with the SCell, and flush all HARQ buffers associated with the SCell. While a SCell is deactivated, the UE should not transmit SRS for the SCell, should not report CQI/PMI/RI for the SCell, should not transmit on UL-SCH for the SCell, should not monitor the PDCCH on the SCell, and should not monitor the PDCCH for the SCell.

It should be noted in particular that the current specifications require the UE to immediately begin transmissions of sounding reference symbols (SRS) as well as CQI/PMI/RI reporting "Immediately," in this context, means that these activities should begin in the transmission time interval (TTI) specified by the timing, relative to the receipt of the activation command, defined in 3GPP TR 36.213: "Evolved Universal Terrestrial Radio Access (E-UTRA); Physical Layer Procedures."

In LTE systems it is essential that uplink transmissions from various UEs are received time-aligned at the base station, to avoid interference to reception in adjacent subframes, which may potentially include transmissions from other UEs. The eNB (evolved Node B) determines, based on the uplink signals received from a UE, whether the UE is time aligned or whether the timing of the signal should be adjusted to arrive earlier or later at the eNB. Misalignment occurs primarily when the distance between the UE and the eNB's antenna changes, i.e., when the UE moves. When the eNB would like to adjust the timing of the uplink transmission of a UE, it sends a MAC control element (MAC CE) known as a timing advance command, containing a timing advance (TA) value. This value is used by the UE to determine the desired uplink transmission time in relation to the downlink reception time at the UE.

The UE generally does not know whether its uplink transmission is received time-aligned unless and until it receives a TA command, which includes a TA value, from the eNB. To ensure that non-time-aligned UEs do not perform any uplink transmission except in support of random access procedures, a time-alignment timer (TAT) was introduced in Release 8 of the 3GPP specifications. The UE maintains this timer and starts or restarts it with a predetermined value, upon reception of a TA command. This predetermined value is configured by RRC signaling from the eNB. When the timer expires, the UE must consider itself as not time-aligned, even though its uplink transmissions might in fact be sufficiently time-aligned at the eNB. The UE must then perform a random access procedure to obtain time alignment again.

As noted above, the duration of the time-alignment timer is chosen by the eNB and signaled to the RRC. A longer value for the timer's duration increases the periodicity at which the eNB needs to send updated TA commands, thus reducing the signaling load. On the other hand, values that are too long create a risk that a quickly moving UE becomes unsynchronized and performs uplink transmissions, such as periodic CQI reports, or dedicated scheduling requests on PUCCH, or sounding reference symbols, that are not properly time-aligned. Therefore, the 3GPP standards specify that the eNB is responsible for choosing a suitable TAT configuration and for keeping track of the estimated expiration time of the TAT in each UE.

Carrier aggregation (CA), described briefly in the Background section above, was introduced in Release 10 (Rel-10) of the 3GPP specifications. While support for carrier aggregation in Release 10 is limited to scenarios in which all uplink serving cells operate with the same time alignment, Release 11 of the standards is intended to support deployments in which UEs need to perform uplink transmission on serving cells having different time-alignment, in order to ensure time-aligned reception at the eNB.

The eNB determines suitable timing advance values for all serving cells, or at least one timing advance value for each group of serving cells having the same propagation delay between UE and eNB. For the primary cell (PCell), the timing advance value determines the time offset between the reception time of the downlink signal at the UE and the transmission time of its uplink signals. The timing advance value for an SCell can be specified in several different ways. For instance, the TA value for an SCell could indicate a time offset relative to the downlink reception time of a downlink carrier that is linked to the SCell, such as via so-called SIB2 linking. Alternatively, the TA value for an SCell could indicate the time offset to the downlink reception time of the PCell (primary cell), or it could be expressed as the timing difference to the uplink transmission in the PCell. Further a TA value might apply to a single SCell, or to a predetermined group of cells.

Accordingly, the information provided in or with a TA command for Release 11 will vary, depending on which approach to TA values is selected. The processes by which a UE accordingly updates the TA values for activated serving cells or groups will also vary. For example, with a grouping concept, a TA command might only contain one value per group, while for an individual TA update, the TA command might include one value per activated serving cell. As another example, when the TA value of an SCell or group of SCells is expressed as an offset to the UL transmission on the PCell, it may be sufficient to only include the time alignment for the PCell in the TA command, as long as the offset for each additional TA remains unchanged. The offsets values for the SCells or groups could also be updated using a TA command with one value per SCell or group.

Another issue that is raised by the more flexible timing scenarios to be supported by Release 11 is the question of how many time alignment timers are needed in order to support multiple timing advances corresponding to multiple cells or groups of cells. One possibility is that the UE maintains one TAT per serving cell, or at least one timer per group of serving cells expected to share a common TA value. However, it should be kept in mind that the sole purpose of the time alignment timer in earlier releases of the 3GPP standards was to prevent non-time-aligned UEs from performing autonomous uplink transmissions. Thus, the need for multiple TATs should be evaluated with respect to whether additional TATs are actually needed to prevent unsynchronized transmissions.

Such misalignment could occur due to loss of connectivity or, more likely, due to the eNB deciding not to provide further TA commands to the UE. Since the eNB keeps track of each UE's time alignment timer, it is at least roughly aware of when the UE's time alignment timer expires. As agreed for Release 10, PUCCH is only transmitted on the PCell. Also, semi-persistent scheduling is only supported on the PCell. All PUSCH transmission on SCells is scheduled by the eNB. The UE may transmit periodic sounding reference symbols on an uplink SCell, which could be considered an autonomous uplink transmission. But, the eNB may at any time disable SRS as long as connectivity to the UE is maintained. As explained above, it is up to the eNB to keep track of the UEs uplink time alignment, to configure the time alignment timer and to provide TA commands. If the eNB is not able or willing to update the time alignment, then the UE should stop a variety of uplink transmission, including the transmission of SRS, on the PCell and on all SCells. This principle applied for Release 10, and should be maintained in Release 11.

UL serving cells that are received at the same geographical location can share a common UL timing advance value. All serving cells that can share a common UL timing advance value can be grouped together. One advantage of grouping is that only a single UL timing advance value is required per group, instead of one value per UL serving cell as would be required without grouping. Because the UL serving cells are necessarily time-aligned with one another in Release 10, Release 10 UL carrier aggregation can be viewed as a special case of this grouping approach, in which all UL serving cells belong to the same group.

Another consideration is that in 3GPP Release 10, random access may only be performed on the PCell. All activated SCells are assumed to have UL synchronization, as long as the TAT is running. This approach works well since there is only one TA value, shared among all UL serving cells, in Release 10. However, in 3GPP Release 11, as part of the enhancements for carrier aggregation support, multiple TA values will be introduced, since they are required for several planned UL deployment scenarios, including UL remote radio head (RRH) and UL repeater scenarios. As a result of introducing multiple TA values, it has been generally assumed in 3GPP that the random access procedure is also needed for SCells in order to obtain UL synchronization, at least in the case when an SCell does not share the TA value of the PCell. Note that the terms "synchronized," "UL synchronized," "synchronization," "UL synchronization," etc., indicate that an uplink transmission on a particular component carrier is received by the base station at a time close enough to an expected time of arrival so that the base station can receive the transmission and so that the transmission does not cause undue interference to other transmissions in the same or adjacent subframes. Put another way, a UE is considered to be UL synchronized on a given component carrier if the UE possesses timing information that allows it to perform transmissions so that they are received at the base station adequately time aligned.

The activation/deactivation mechanism for SCells, which originates in the 3GPP Release 10 specifications, describes the functionality that the UE shall activate/start upon reception of an activation command. Since in Release 10 all SCells are assumed to be UL synched as long as the TAT is running, there is no need for an SCell to obtain UL synchronization upon activation, even if it has been deactivated for some time, as the UE would just assume the single TA value available in the UE. However, in Release 11 an SCell may not always share the TA value of the PCell or any other already UL synchronized SCell, and thus the UE cannot simply assume a TA value upon activation of the SCell. In order to become UL synchronized and obtain a correct/exact TA value, the general approach is to perform a random access procedure on the SCell and obtain a valid TA value in the random access response. Currently, no random access attempt is specified as part of the SCell activation mechanism, but one approach is for the eNB, which is assumed to know whether the UE needs to obtain UL synchronization specifically for this SCell or whether it can assume the same TA as another serving cell or group of serving cells, to request a PDCCH-ordered random access procedure, at the time of the SCell's activation. Alternatively, the UE could autonomously, or based on some indication or criteria, trigger a random access procedure on a newly activated SCell.

As noted in the description above of the Release 10 SCell activation procedure, the UE begins to monitor PDCCH in the same subframe in which it starts to transmit a sounding reference signal (SRS). However, since an SRS that is sent on a component carrier (CC) that is not UL synchronized could disturb transmission over other UL serving cells, sending SRS on an unsynchronized UL cell is not desired.

Furthermore, one potential design choice in LTE Release 11 is to have a single Time Alignment Timer (TAT). As long as this timer is not expired, the UE assumes that all UL SCells are synchronized. Upon expiration of this timer, all UL SCells are assumed to be unsynchronized. However, upon activation of an UL SCell, the UL SCell may or may not actually be synchronized. For example, an eNB may decide not to keep a de-activated SCell in UL synchronized state. In the meantime, however, the eNB continues to keep the UL PCell in synchronization, by sending TA commands as needed, and therefore the TAT is not expired. This creates a potential problem, since a UE for which an UL unsynchronized SCell is becoming activated and for which SRS is configured may now transmit SRS, prior to UL synchronization for that SCell. This could create interference to other UL transmissions. More generally, even if the UE maintains multiple Time Alignment Timers (TAT), corresponding to multiple component carriers or multiple groups of component carriers, a given UL SCell may nevertheless be unsynchronized at activation.

One solution to this problem can be described generally as follows. If a UL SCell belongs to a group, the UL synchronization state for that SCell can be derived from the group. Thus, if any group member is UL synchronized, then all other group members are also UL synchronized and the UE is therefore allowed to perform UL transmissions, including SRS transmissions, on any activated member of the group. If no group member is synchronized, at least one member of the group must become synchronized before any UL transmissions, other than random access procedures, are made. This synchronization can be achieved with an ordered random access procedure, a UE-initiated random access, or the reception of a UL timing advance command. In the event that grouping is used, the UE would know for each configured serving cell which group it belongs to. This group membership would be decided and managed by the eNB, and can be signaled to the UE using conventional signaling techniques, such as via RRC configuration messages.

If grouping is not applied, one approach to signaling the synchronization status of an SCell is to include a synchronized/unsynchronized parameter in the RRC reconfiguration command that sets up a given SCell. Alternatively, a flag can be added to the activation command for the UL SCell, the flag indicating in various embodiments, whether or not immediate UL transmissions are permitted on this SCell, or whether or not a UL timing advance command must be received prior transmission, or whether or not a random access procedure should be initiated by the UE upon activation.

In the following detailed description of several embodiments of these techniques, the notation "UL timing advance" is used. This refers to the UL timing command, as defined in Release 10, but also to any timing offset value that expresses how much the timing of a corresponding SCell (for which the UL timing advance command is valid for) must be altered relative to the PCell. It should be further noted that the following description does not distinguish between the UL timing advance command that is received as part of the random access response or the dedicated UL timing advance command; either may be used to achieve UL synchronization for a given SCell.

As used herein, the term "activation command" can refer to the Release 10 behavior, where only an explicit DL activation command is defined, but may also refer to an explicit UL activation command. In the first case, the activation command addresses a DL SCell, but certain parameters targeting the linked UL SCell may be included in the command. An explicit UL activation, which is not defined in Release 10, directly addresses an UL SCell.

A "regular" UL transmission is a UL transmission that requires UL synchronization, e.g., a PUSCH or PUCCH transmission. It should be noted that in Release 10 PUCCH is only transmitted on the PCell, and hence to transmit PUCCH, the PCell needs to be UL synchronized even if the information transmitted on PUCCH is for an SCell. In Release 11 or later, PUCCH might also be supported on SCells.

As noted above, if a single TAT solution is adopted then it is possible that an activated UL SCell may not be UL synchronized at a given time, whether immediately upon activation or after TAT expiration. Further, if a multiple TAT solution is adopted, the UL SCell may still not be UL synchronized immediately upon activation. If such an UL SCell has SRS configured, i.e., if RRC signaling setting up the UL SCell indicates that SRS should be transmitted when the SCell is activated, and if a UE thus performs a transmission before UL synchronization is obtained, then interference to other users is introduced. The same issue may also apply for semi-persistent scheduled PUSCH transmissions, if semi-persistent PUSCH is adopted for SCells.

Depending on whether grouping is adopted or not, the solutions may look somewhat different. First, if SCells are grouped, then in some embodiments of the invention a terminal is only allowed to perform transmissions on a UL serving cell if at least one other UL serving cell belonging to the same group is UL synchronized. This is equivalent to stating that this entire specific group is UL synchronized. In this case, all other UL serving cells in the same group can reuse the UL transmission timing of any one UL synchronized serving cell belonging to the group.

In these embodiments, if the group is not UL synchronized, then the UE is not allowed to perform UL transmissions, except for random access, for any of the UL serving cells belonging to this group. An alternative is to restrict only SRS transmissions and semi-persistent scheduled PUSCH, if adopted for SCells, since regular PUSCH transmission are dynamically scheduled and an eNB, which is aware of the synchronization status of each SCell, should not dynamically schedule PUSCH on an unsynchronized UL. To obtain permission to perform UL transmissions, the group, i.e., at least one UL serving cell belonging to this group, should first become UL timing synchronized. As soon as this happens, the transmit timing obtained for one group member can be reused for other UL serving cells in the group.

If a given group contains the PCell, it can be assumed that at initial access or after TAT expiry, whether of the sole TAT in a system employing a single-TAT approach or of a group-specific TAT in other systems, the UE can, just as in Release 10, perform UE-initiated random access for the PCell. The TA value obtained through this procedure is then used for SCells in that group.

For a group containing only SCells, the same rule can be applied, but for SCell configuration or SCell activation or after TAT expiry. Alternatively, a random access to the SCell can be restricted to only eNB triggered random access, e.g., so called PDCCH-ordered random access procedure. Several possible approaches are discussed below. It should be noted that these techniques may be used in any combination, at least to the extent that the techniques are not clearly contradictory in nature.

In a first approach, the UE is programmed to wait for ordered random access. After the eNB has ordered a random access for at least one UL SCell of the group, and after the terminal has performed the random access and received the random access response with the UL timing advance command, the UE is permitted to perform regular transmissions, with accordingly corrected transmission timing, in all UL SCells of the group. Instead of a random access order and response, the eNB can also send an UL timing advance command without a preceding random access, if the eNB has a priori knowledge about the required UL timing advance.

In another approach, when no member of a group of UL SCells is synchronized, the UE autonomously performs random access on any of the UL SCells belonging to the group. Upon reception of the random access response, with the UL timing advance command, and after adjustment of the UL transmission timing, the entire group is UL synchronized. The UE is now allowed to perform regular transmissions for any of the UL serving cells belonging to the group.

Another technique that may be used alone or in combination with the other techniques disclosed herein is as follows: If a group loses UL synchronization, then the UE is not allowed to perform regular transmissions for any UL SCell belonging to the group for a specified time. This time can either be fixed or signaled to the terminal via RRC or MAC CE signaling. Upon expiry of this time, the UE may resume regular transmissions for any UL SCell of the group (subject to the TAT). The rationale behind this approach is that the enforced delay provides the eNB with sufficient time to order random access or to send a UL timing advance command to the terminal to restore UL synchronization of the group. If the eNB has knowledge that the group is still in valid UL synchronization state (even though the terminal believes it has lost synchronization) the eNB does not have to explicitly act, since after expiry of the waiting time, the UE will simply resume its transmission.

In still another approach, the UE takes the receipt of an UL grant for any member of a group as an indication that the group is synchronized. With this approach, the UE is permitted to begin SRS transmission on an Scell that is currently unsynchronized at a TTI corresponding to an UL grant for any SCell of this group, in some embodiments. In other embodiments, the UE may be configured to begin SRS transmissions on a SCell belonging to to a group as soon as an UL grant for any member of the group is received.

The techniques described immediately above may be applied in scenarios where SCells are grouped. Variants of these techniques, as well as additional techniques, may be applied to scenarios where SCells are not grouped. In one approach, the UE is prohibited from transmitting in a recently activated UL SCell either until it has received an UL timing advance command or until after a specified time is expired. However, this approach increases latency for situation where a UL SCell could reuse transmits timing of another SCell.

Another approach is to restrict only SRS transmissions and semi-persistent scheduled PUSCH transmissions until synchronization is achieved. A regular PUSCH transmission is dynamically scheduled, and an eNB should not dynamically schedule PUSCH on an unsynchronized UL, so dynamically scheduled PUSCH transmissions may be allowed, in embodiments employing this approach.

Several alternative techniques are discussed in the following paragraphs. Again, it should be noted that these techniques may be used in any combination, at least to the extent that the techniques are not clearly contradictory in nature.

In a first technique, a flag is included in an RRC reconfiguration command or activation command. This flag indicates whether a terminal, upon activation of an UL SCell, must wait until it receives a UL timing advance command or whether it is allowed to immediately start with regular transmissions on the UL SCell. The flag (or another flag) could also be used to indicate that the UE may initiate a random access and that it should wait until it has completed before it is allowed to start with regular transmissions on the SCell. The flag can either be a bit or it can be a message field with at least two distinct values. In some embodiments, the presence or non-presence of this message field can indicate the first and second value of the flag.

If the flag indicates that the UE can immediately begin regular transmissions on the SCell, the UL transmit timing that must be used for the SCell can be that of the PCell or it can be configured. For instance, during configuration of the UL SCell the UE may be told which UL cell's timing should be used. Alternatively, instead of a simple flag a cell index, or any other indicator addressing an UL SCell, can be included in the activation command, pointing out the UL SCell whose transmit timing should be applied.

In another approach, the activation command for the UL SCell contains a random access order. Upon completion of the random access procedure and application of the received UL timing advance command the UL SCell may start with regular transmissions. If no random access order is included in the activation command the terminal may either start with transmissions on the UL SCell immediately or after a specified waiting time.

Finally, in yet another approach, the UE is configured to start SRS transmission on a given SCell no earlier than when the first UL grant for this SCell is received.

Another problem may arise with a single TAT solution if the eNB sends UL timing advance for an SCell and the UE misses this command. If the UE is configured so that only UL timing command for the PCell (or another distinguished cell) restarts the single TAT, then missing the UL timing advance command for the SCell does not impact the TAT status, since, for example, a separate PCell UL timing advance command may have restarted the TAT. However, without the information sent in the timing advance command, the transmission timing of the UL SCell may drift away and eventually become insufficiently synchronized, without the UE recognizing it.

One solution to this is to arrange the transmission of UL timing advance commands for a UL SCell so that they are transmitted in the same message (e.g., in the same MAC CE) as a UL timing advance command for UL PCell. If this combined message is missed, then the PCell TAT is also not restarted. In this case, the PCell TAT will soon expire, prohibiting regular UL transmissions on all UL cells.

Transmitting UL timing advance command for PCell and SCell together can either be a proprietary solution, or it can even be standardized, e.g., such that a special MAC CE is designed that always includes a UL timing advance command for the PCell, or any SCell that restarts the TAT, as well as for a variable number of other UL cells.

Figure 6:
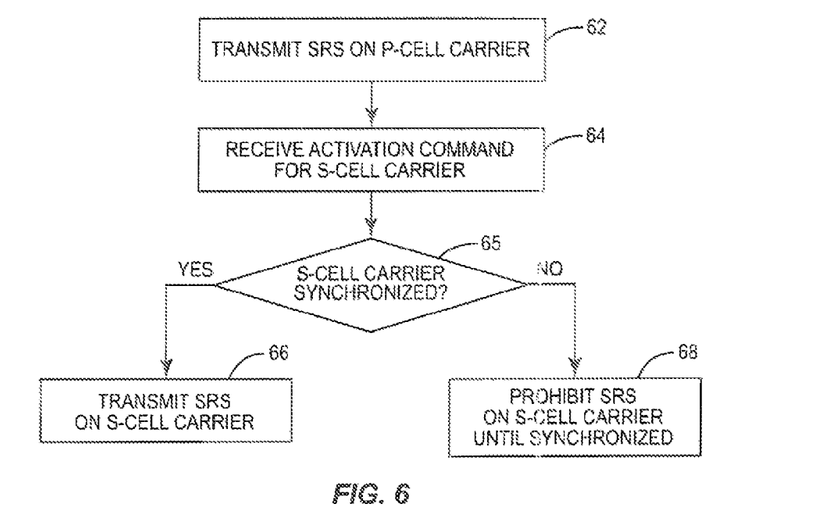
FIG. 6 is a process flow diagram illustrating a method for transmitting sounding reference signals.
Figure 7:
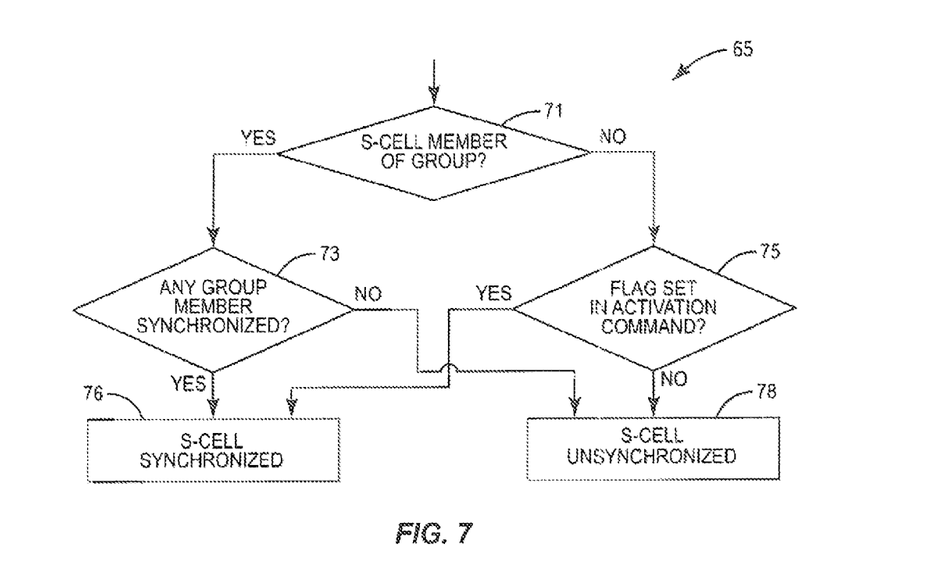
FIG. 7 is a process flow diagram illustrating a method for determining whether an uplink secondary cell (SCell) is synchronized.

Those skilled in the art will appreciate that practical embodiments of the techniques described above will include signaling and control methods, such as might practiced in a base station, mobile station, or both. FIGS. 6 and 7 provide process flow diagrams illustrating example embodiments of methods that can be implemented in a wireless transceiver, such as might be found in a UE configured for operation in LTE networks.

FIG. 6 illustrates one method for reducing interference in a wireless communication system that supports uplink carrier aggregation, according to one or more of the techniques described in detail above. As discussed above, in a multi-carrier system the PCell is always configured and activated. The PCell may also be configured for SRS by the base station, which means that the UE has been provided with configuration data indicating that SRS should be transmitted, as well as certain settings specifying the bandwidth, duration, and periodicity of the SRS. In this case, the UE's wireless transceiver is configured to transmit SRS on an uplink primary component carrier (PCC), i.e., the carrier signal corresponding to the primary cell (PCell). This is shown at block 62.

As shown at block 64, the wireless transceiver may then receive an activation command corresponding to a UL secondary component carrier (SCC), i.e., a carrier signal corresponding to a secondary cell (SCell). The wireless transceiver must then determine whether the wireless transceiver has valid timing information for the UL SCC, as shown at block 65. The possession of valid timing information for the UL SCC indicates that the UL SCell is UL synchronized. Accordingly, the phrases "a terminal has valid timing information for a particular component carrier" and "a particular cell is UL synchronized" can be viewed as interchangeable for the purposes of this discussion.

If the SCell is UL synchronized, then regular transmissions can take place on that SCell. Those transmissions can include the transmission of SRS on the SCC, as shown at block 66, if the SCell is configured for SRS, i.e., if the wireless transceiver has been provided configuration data indicating that SRS should be transmitted on that cell and specifying the parameters of the SRS to be transmitted. In other words, the wireless transceiver is configured to enable the transmission of SRS on the SCell, if it determines that the SCell is UL synchronized. Otherwise, as shown at block 68, the wireless transceiver prohibits transmission of SRS on the SCC until the SCell is synchronized.

As described above, there are several possible techniques for determining whether the wireless transceiver has valid timing information for the newly activated SCell. A few of these techniques are illustrated in the process flow diagram of FIG. 7. This approach begins, as shown at block 71, with determining whether the UL SCC (or UL SCell) belongs to a pre-determined group. If so, then the wireless transceiver next determines whether any member of the group is synchronized, as shown at block 73. If so, then the SCell at issue is synchronized, as shown at block 76, and if not, the SCell should be considered unsynchronized, as shown at block 78. On the other hand, if the SCell is not a member of a group, then the wireless transceiver uses other techniques to determine whether the SCell is synchronized. For example, as shown at block 75, the transceiver checks to see whether a flag in the activation command for the SCell is set to a pre-determined value. If so, then the SCell can be considered synchronized, as shown at block 76. If not, the SCell should be regarded as unsynchronized, as indicated at block 78.

If an activated SCell that belongs to a predetermined group is not initially synchronized, there are several ways for it to become synchronized, such that the wireless transceiver can enable transmission of SRS, if and when the SCell is configured for SRS. One way is that the wireless transceiver receives timing information for at least one member of the predetermined group, which indicates that the entire group is synchronized and that SRS transmission can be enabled. This timing information may be a timing advance command received in a MAC control element, in some embodiments or in some scenarios. In other scenarios or embodiments, the timing information is a timing advance command received in response to a random access procedure performed in response to a random access order for at least one member of the pre-determined group. Similarly, the timing information may be a timing advance command received in response to a terminal-initiated random access procedure, in other embodiments and/or scenarios.

In these and other embodiments, the wireless transceiver may be configured to wait a predetermined delay time, upon determining that the UL SCC is not UL synchronized. Upon expiration of the pre-determined delay time, the wireless transceiver no longer prohibits transmission of SRS on the UL SCC carrier. Of course, the wireless transceiver may enable SRS transmission sooner, if some intervening event, such as an ordered random access, provides synchronization in the meantime.

Several techniques for determining whether an activated SCell is synchronized do not necessarily rely on grouping of SCells. For example, a wireless transceiver may determine that it has valid timing information for a newly activated UL SCell by receiving a flag at the wireless transceiver, the flag indicating whether the wireless transceiver has valid timing information for the UL SCC. This flag may appear in the activation command for the UL SCell, for example. In another approach, the activation command for an UL SCell contains a random access order, and transmission of SRS on the UL SCC is prohibited until a random access procedure for the UL SCC is completed. Because the timing information necessary for synchronization is found in the timing advance (TA) command, in some cases transmission of SRS on the UL SCC may only be prohibited until a TA command valid for the UL SCC is received as part of the random access procedure. Still further, some wireless transceivers may be configured to receive an uplink grant for a UL SCC that is currently considered to be unsynchronized and, in response to receiving the uplink grant, enabling transmission of SRS on the UL SCC when SRS is configured. With any of these techniques, if the SCell at issue is part of a group, other SCells in that group may also be regarded as synchronized at the same time.

As noted earlier, the methods/techniques described above may be implemented by a wireless transceiver apparatus configured for operation in an LTE-Advanced network or other network supporting multi-carrier operation. A block diagram for one such transceiver device is pictured in FIG. 8, which illustrates a few of the components relevant to the present techniques, as realized in a mobile terminal, for example.

Figure 8:
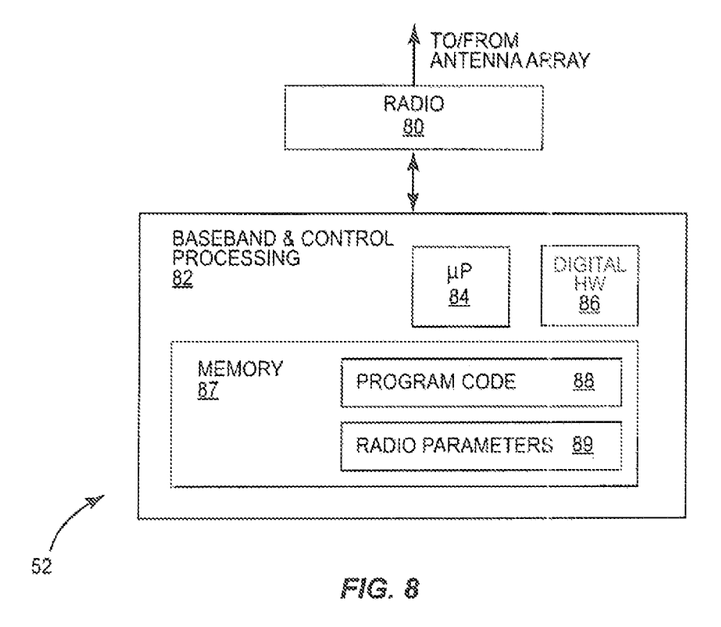
FIG. 8 is a block diagram illustrating features of an example wireless transceiver.

The pictured apparatus 52 includes radio circuitry 80 and baseband & control processing circuit 82. Radio circuitry 80 includes receiver circuits and transmitter circuits that use known radio processing and signal processing components and techniques, typically according to a particular telecommunications standard such as the 3GPP standard for LTE-Advanced. Because the various details and engineering tradeoffs associated with the design of such circuitry are well known and are unnecessary to a full understanding of the invention, additional details are not shown here.

Baseband & control processing circuit 82 includes one or more microprocessors or microcontrollers 84, as well as other digital hardware 86, which may include digital signal processors (DSPs), special-purpose digital logic, and the like. Either or both of microprocessor(s) 84 and digital hardware 86 may be configured to execute program code 88 stored in memory 87, along with radio parameters 89. Again, because the various details and engineering tradeoffs associated with the design of baseband processing circuitry for mobile devices and wireless base stations are well known and are unnecessary to a full understanding of the invention, additional details are not shown here The program code 88 stored in memory circuit 87, which may comprise one or several types of memory such as read-only memory (ROM), random-access memory, cache memory, flash memory devices, optical storage devices, etc., includes program instructions for executing one or more telecommunications and/or data communications protocols, as well as instructions for carrying out one or more of the techniques described herein, in several embodiments. Radio parameters 89 may include, for example, one or more pre-determined tables or other data relating SRS bits (both implicit and explicit) to SRS configurations and to configured cells/carriers, so that the base station and mobile stations will have a mutual understanding of the SRS configuration to be used in any given situation.

Examples of several embodiments of the present invention have been described in detail above, with reference to the attached illustrations of specific embodiments. Because it is not possible, of course, to describe every conceivable combination of components or techniques, those skilled in the art will appreciate that the present invention can be implemented in other ways than those specifically set forth herein, without departing from essential characteristics of the invention.

What is claimed is:

1. A method, in a wireless transceiver of a radio access terminal in a wireless communication system that supports uplink carrier aggregation, the method comprising:
    transmitting sounding reference signals (SRS) on an uplink primary component carrier to a base station; and
    receiving an activation command corresponding to an uplink secondary component carrier (SCC) from the base station;
    determining whether the wireless transceiver has valid timing information for the uplink SCC, wherein valid timing information for the uplink SCC indicates that the uplink SCC is uplink synchronized to the base station; and,
    in response to said determining, enabling transmission of the SRS on the uplink SCC if the uplink SCC is synchronized, and otherwise prohibiting transmission of the SRS on the uplink SCC until the uplink SCC is uplink synchronized.

2. The method of claim 1, wherein determining whether the wireless transceiver has valid timing information for the uplink SCC comprises:
    determining that the uplink SCC belongs to a pre-determined group of component carriers; and
    determining that the uplink SCC is uplink synchronized if any member of the pre-determined group of component carriers is uplink synchronized, and otherwise determining that the uplink SCC is not uplink synchronized.

3. The method of claim 2, further comprising:
    receiving timing information for at least one member of the pre-determined group of component carriers; and,
    in response to the timing information, enabling transmission of the SRS on the uplink SCC when the SRS is configured.

4. The method of claim 3, wherein the timing information comprises a timing advance command received in a MAC control element.

5. The method of claim 3, wherein said timing information comprises a timing advance command received in response to a random access procedure performed in response to a random access order for at least one member of the pre-determined group.

6. The method of claim 3, wherein said timing information comprises a timing advance command received in response to a terminal-initiated random access procedure.

7. The method of claim 1, wherein determining whether the wireless transceiver has valid timing information for the uplink SCC comprises receiving a flag at the wireless transceiver, the flag indicating whether the wireless transceiver has valid timing information for the uplink SCC.

8. A wireless transceiver of a radio access terminal for use in a wireless communication system that supports uplink carrier aggregation, the wireless transceiver comprising:
    a radio circuit adapted to receive signals on at least one downlink carrier from a base station, and to transmit signals on a plurality of uplink carriers to the base station, the uplink carriers including an uplink-primary component carrier (PCC) and an uplink secondary component carrier (SCC); and
    a processing circuit operatively connected to the radio circuit and adapted to:
        transmit sounding reference signals (SRS) on the uplink PCC, using the radio circuit;
        receive an activation command corresponding to the uplink SCC, via the radio circuit;
        determine whether the wireless transceiver has valid timing information for the uplink SCC, wherein valid timing information for the uplink SCC indicates that the uplink SCC is uplink synchronized to the base station; and,
        in response to said determining, enable transmission of the SRS on the uplink SCC if the uplink SCC is synchronized, and otherwise prohibit transmission of the SRS on the uplink SCC until the uplink SCC is uplink synchronized.

9. The wireless transceiver of claim 8, wherein the processing circuit is configured to determine whether the wireless transceiver has valid timing information for the uplink SCC by:
    determining that the uplink SCC belongs to a pre-determined group of component carriers; and
    determining that the uplink SCC is uplink synchronized if any other member of the group is uplink synchronized, and otherwise determining that the uplink SCC is not synchronized.

10. The wireless transceiver of claim 9, wherein the processing circuit is further configured to:
    receive timing information for at least one member of the pre-determined group of component carriers; and,
    in response to the timing information, enable transmission of the SRS on the uplink SCC when the SRS is configured.

11. The wireless transceiver of claim 10, wherein the timing information comprises a timing advance command received in a MAC control element.

12. The wireless transceiver of claim 10, wherein the timing information comprises a timing advance command received in response to a random access procedure performed in response to a random access order for at least one member of the pre-determined group.

13. The wireless transceiver of claim 10, wherein said timing information comprises a timing advance command received in response to a terminal-initiated random access procedure.

14. The wireless transceiver of claim 8, wherein the processing circuit is configured to determine whether the wireless transceiver has valid timing information for the uplink SCC by receiving a flag at the wireless transceiver, the flag indicating whether the wireless transceiver has valid timing information for the uplink SCC.

* * * * *

UNITED STATES PATENT AND TRADEMARK OFFICE
CERTIFICATE OF CORRECTION

PATENT NO.         : 8,995,352 B2                                    Page 1 of 1
APPLICATION NO.    : 14/259290
DATED              : March 31, 2015
INVENTOR(S)        : Boström et al.

It is certified that error appears in the above-identified patent and that said Letters Patent is hereby corrected as shown below:

IN THE SPECIFICATION

In Column 1, Lines 7-8, delete "Sep. 14, 2011," and insert -- Sep. 14, 2011, now Pat. No. 8,743,787, --, therefor.

In Column 13, Line 57, delete "to to" and insert -- to --, therefor.

Signed and Sealed this
Twenty-third Day of February, 2016

Michelle K. Lee
*Director of the United States Patent and Trademark Office*